United States Patent [19]

Hetland

[11] 4,173,351

[45] Nov. 6, 1979

[54] LAWN LITTER SLED

[76] Inventor: Philip R. Hetland, 915 River Dr., Moorhead, Minn. 56560

[21] Appl. No.: 941,054

[22] Filed: Sep. 11, 1978

[51] Int. Cl.$^2$ .............................................. B62D 15/00
[52] U.S. Cl. ........................................ 280/19; 280/18
[58] Field of Search ........................ 280/19, 18, 12 R

[56] References Cited

U.S. PATENT DOCUMENTS

| | | | |
|---|---|---|---|
| 3,355,187 | 11/1967 | Brindle | 280/19 |
| 3,432,181 | 3/1969 | McKee | 280/18 |
| 3,752,492 | 8/1973 | Davies | 280/18 |
| 3,771,808 | 11/1973 | Dnerst | 280/19 |

*Primary Examiner*—Robert R. Song

*Attorney, Agent, or Firm*—Kinney, Lange, Westman and Fairbairn

[57] ABSTRACT

A lawn litter sled for the purpose of hauling leaves, grass clippings, papers, twigs and other such matter. A precut, corrugated cardboard may be assembled into a rectangular, or other geometric form, sled that when filled with lawn litter may be easily dragged along the ground. The said apparatus has a folding loading panel which, when in a horizontal position, enables the user to sweep lawn litter into the said sled, then by positioning the loading panel into a vertical position and by pulling on a provided rope, the loading panel may be secured in a vertical position by frictional forces the loading panel is attached to side panels through which fold and hold the loading panel upright to secure the contents of the sled.

7 Claims, 7 Drawing Figures

LAWN LITTER SLED

BACKGROUND OF THE INVENTION

1. Field of the Invention

The present invention relates to an apparatus for the securing of lawn litter within the confines of the apparatus and which includes means to haul such litter in its confined state.

2. Prior Art

In the prior art, lawn litter such as leaves, grass clippings, papers and twigs have been swept up and placed on flat sheets cut from old boxes and dragged along the ground. This method of transporting lawn litter has the disadvantage of the litter falling off while being dragged along the ground due to the absence of vertical sides confining the litter within.

Other devices such as plastic bags have the disadvantage being hard to fill and of forcing the user to carry the contents, a task that may require a considerable amount of physical strength especially in the case of wet grass clippings. Bags usually cannot be dragged due to their inherent tendency to rip while being dragged.

Other devices such as wagons and wheelbarrows that have retaining side panels and eliminate carrying the contents require a considerable economic investment by the user, and are bulky to store.

The present invention fills the gap between the makeshift transporting device and the devices needing a considerable amount of strength or requiring a considerable economic investment. The present invention differs from the prior art in its low cost and ease of operation with the advantageous characteristic of being able to hold the contents confined, unlike the makeshift devices.

SUMMARY OF THE INVENTION

The present invention relates to a lawn maintenance apparatus used in the task of sweeping up and transporting lawn litter such as leaves, grass clippings, paper and twigs. The apparatus is comprised of two members, a flexible cord and a carrying body made of a material such as corrugated cardboard having upright, foldable end and side panels or walls and a loading panel.

The flexible cord functions as a tow rope, a fastener to hold a loading panel in a vertical position, and a lateral support to the end and side panels of the carrying body.

The carrying body may be rectangular in shape with vertical sides to contain lawn litter during the act of transporting the litter as well as during stationary periods. It should be understood that the carrying body may be of any preferable geometrical shape such as elliptical or trapezoidal and the present invention is not thought to be confined to a rectangular configuration. The carrying body also contains a front loading panel that may be moved to a horizontal position for sweeping lawn litter into the carrying body or to a vertical position for confining and restraining the lawn litter within the perimeter of the carrying body. The flexible cord, when sequentially threaded through a series of holes in the side, gusset and loading panels serves as a retainer for holding the loading panel in a vertical position after loading.

Thus the object of the invention is to provide a box apparatus that has a folding panel which can be lowered to permit the apparatus to be easily filled with lawn litter by a sweeping or raking motion, and the panel can be raised to confine the lawn litter within the apparatus as the apparatus is pulled along the ground to a disposal area.

DESCRIPTION OF THE PREFERRED EMBODIMENT

Figure 1:
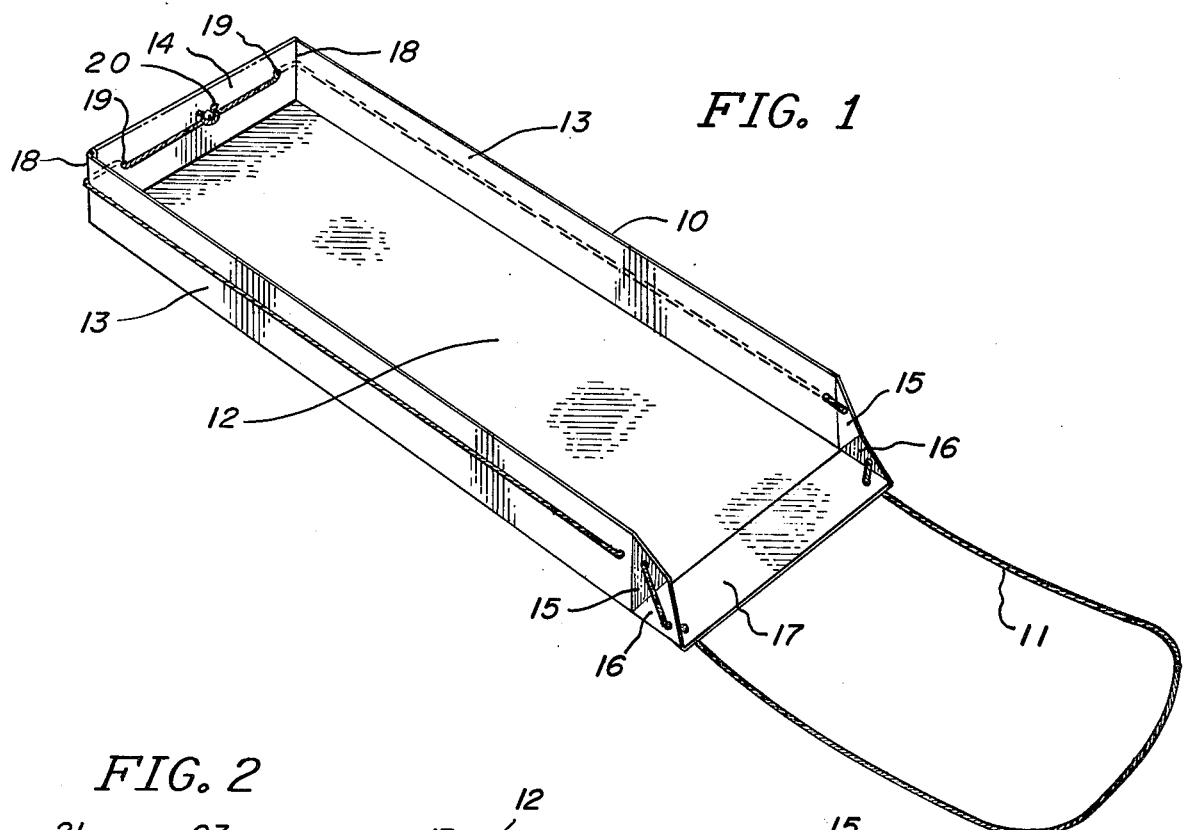
FIG. 1 is a perspective view of apparatus made according to the present invention with a loading panel in a horizontal position.

Referring to FIG. 1, the apparatus consists of a carrying body or sled generally illustrated at 10 having a flexible cord member 11 mounted on the body.

The carrying body 10 is formed by a bottom panel 12, two side panels 13, an end panel 14, gusset panels 15, 16 and loading panel 17. The carrying body may be made of any suitable sheet-type material such as corrugated cardboard. The bottom panel 12 has a pair of substantially vertical side panels 13, a substantially vertical end panel 14 and loading panel 17 hinged thereto along fold lines. The side panels 13 and end panel 14 may be joined together at corners 18 in any conventional fashion that may be preferred, such as a tab panel which will be more fully explained. The panels 14 may be bound together by staple, adhesive tape or cord to form a rigid corner generally at 18.

Figure 4:
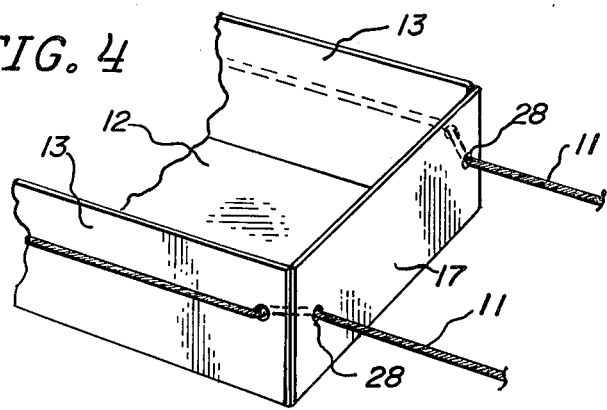
Fig. 4 is a fragmentary perspective view with the loading panel in the vertical closed position.

The loading panel 17 is hinged at a fold line to bottom panel 12 and its opposite ends are hinged at fold lines to separate gusset panels 16, each of which is hinged at a fold line to separate gusset panels 15. The panels 15 are in turn hinged at fold lines to the respective side panel 13. As can be seen more clearly in FIG. 2 the gusset panels 15 and 16 at each end of the loading panel form a gusset panel set and fold adjacent to each other and inwardly with respect to the interior of the carrying body or sled. This method of folding allows loading panel 17 to move into a generally vertical position and form vertical corners with the side panels 13. The loading panel in its closed position is shown in FIG. 4.

When the loading panel is in its horizontal position as shown in FIG. 1, lawn litter may be swept or raked into the interior of the carrying body as shown by the arrows. When the carrying body has been filled, the loading panel is moved into a substantially vertical position to confine the litter within the carrying body as shown in FIG. 4.

Figure 2:
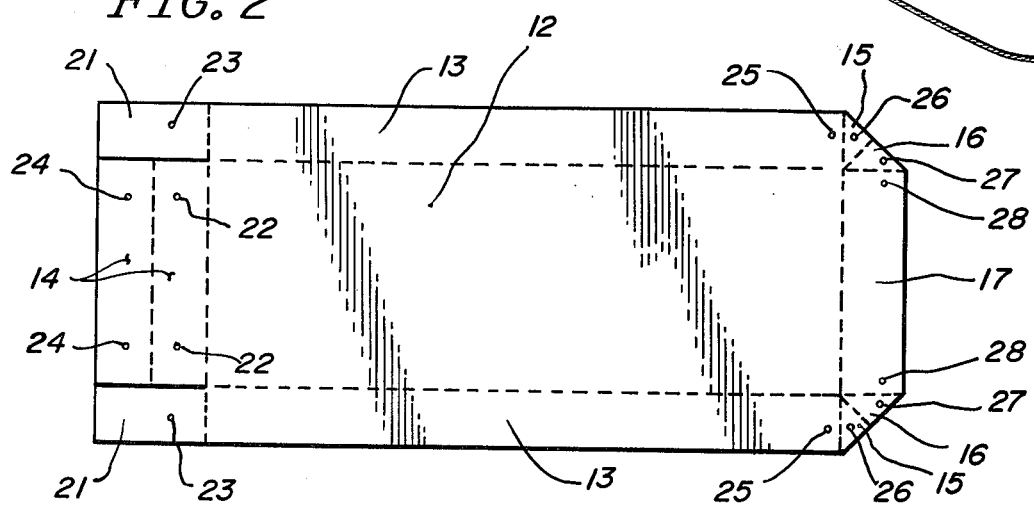
FIG. 2 is a top plan view of the apparatus in a flat unassembled state.
Figure 3:
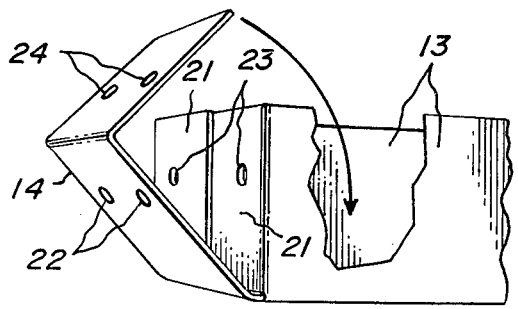
FIG. 3 is a fragmentary perspective view of the assembly of an end panel used to form the apparatus.

The entire panel 14 is preferably formed as shown in FIGS. 2 and 3. The side walls 13 each have tabs 21 which are placed at right angles to the walls 13 and overlap each other. The panel 14 is in two sections and folds over the tabs 21 as shown in FIG. 3 by the arrow. When the cord is threaded through provided openings as is explained later, the end panel is held in place.

Figure 7:
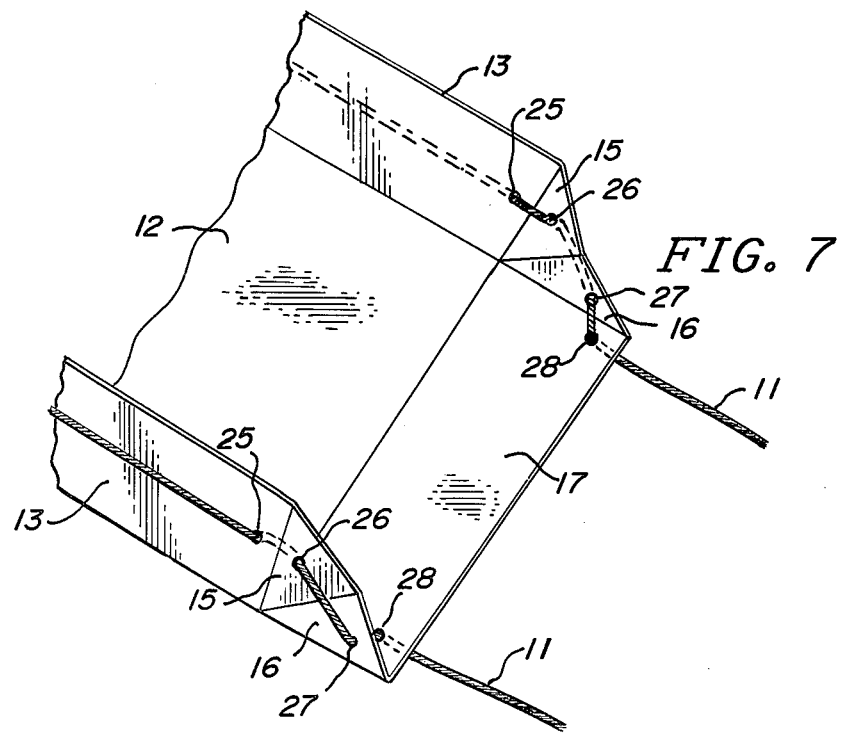
FIG. 7 is a perspective fragmentary view of apparatus of FIG. 1 with the loading panel in a horizontal position.

The flexible cord 11, as shown in FIG. 1, serves several purposes in cooperation with the carrying body 10. The cord 11 may serve as a retainer in the assembly of the rear or end panel of the carrying body as shown in FIG. 7. The cord as shown is threaded sequentially through holes 22, 23 and 24 after the end panel 14 is folded over the tab panels 21 in the direction indicated by the arrow at one end of the end panel. The cord then is passed back out through holes 22, 23 and 24 (FIG. 2) at the other end. Thus the assembled end panel as indicated by 14 in FIG. 1 will have the cord threaded through the three aligning holes on each end of the panel as represented generally by 19 at each end of the panel 14. The cord does not necessarily have to be of one piece and may be spliced as indicated by knot 20.

Figure 5:
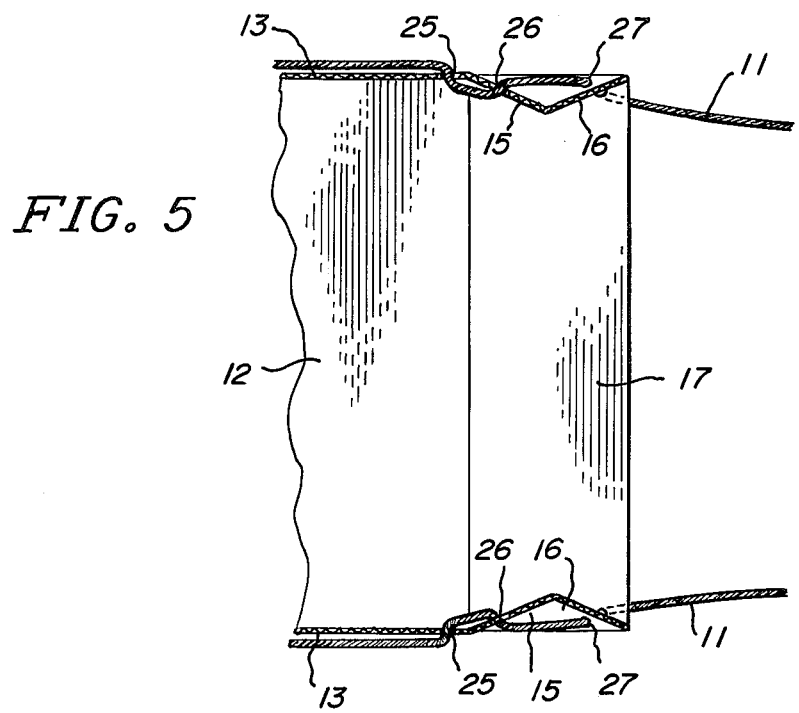
FIG. 5 is a fragmentary top plan view of the loading panel of the device.
Figure 6:
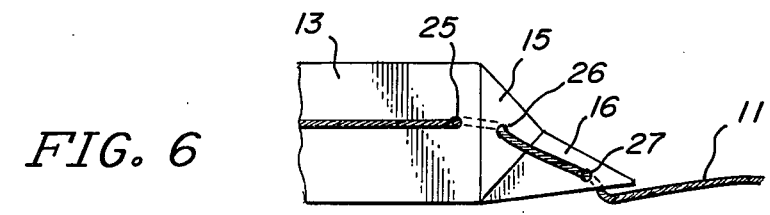
FIG. 6 is a fragmentary side plan view of the loading panel of FIG. 5.

The cord 11 serves as a retainer in holding the loading panel in a substantially vertical position by being threaded sequentially at each end of the loading panel 17, as shown in FIGS. 5, 6 and 7. The cord passes through hole 28 at one end of the loading panel 17, then through hole 27 in the adjacent gusset panel 16, then through hole 26 in the gusset panel 15 of that gusset panel set and through hole 25 in the adjacent side panel 13. The cord is then passed along the side panel, threaded through the holes in the end panel 14, around the opposite side panel and through the holes in the gusset panels and loading panel at the opposite end. Thus the combination of the cord being threaded in the described manner with the gusset panels 15 and 16 being folded in the manner described above and the holes 25 through 28 being of a sufficiently small diameter to develop a frictional force between the hole defining surfaces and the cord will retain the loading panel 17 in a substantially vertical position with a tug on the cord 11 to draw the slack up from between the panels. The panels will slip on the cord when the loading panel is again lowered.

The cord 11 also serves as a lateral support to the vertical side panels 13, as shown in FIG. 1, when the cord is positioned on the outside perimeter of the carrying body 10. Thus when the carrying body has been filled with lawn litter, the cord will act as a reinforcing support to the vertical sides of the carrying body, both in a stationary position and during the act of dragging the lawn litter sled.

The cord 11 also extends forward and is employed as a tow rope in enabling the user to drag the carrying body along the ground. The tow rope is shown in a preferred manner in FIG. 1. The cord may be made of any suitable synthetic or natural material and should have some degree of strength when in tension and some degree of flexibility for ease of handling.

FIG. 2 shows the carrying body as a flattened sheet of material with the solid lines indicating panel cuts and the dotted lines indicating fold lines. The entire carrying body may be assembled from one piece of material with the only waste occurring from the angular cut that is required in order to form and fold gusset panels 15 and 16.

The carrying body does not necessarily have to be of a rectangular configuration but may be of any preferable geometric shape such as ellipitcal or trapezoidal. It should be understood that other geometrical shapes may dictate a different number of side panels and end panels, but the loading panel 17 and gusset panels 15, 16 are important parts of the present invention.

What is claimed is:
1. A lawn litter sled comprising:
   a carrying body including a bottom panel, a substantially vertical end panel and side panels hinged to said bottom panel, a loading panel extending between said side panels and movable between a substantially vertical and a substantially horizontal position, cord guide means for guiding a flexible cord, flexible cord means frictionally held in at least one cord guide means in position to encircle the end and side panels of the carrying body, wherein said cord means provides lateral support to said side and end panels, said cord means also comprising a tow rope to drag said sled along the ground.
2. A lawn litter sled as described in claim 1 comprising:
   separate sets of foldable gusset panels between said loading panel and each adjacent side panel, each set including at least two gusset panels which fold relative to each other whereby said loading panel can be moved from its substantially horizontal to its substantially vertical position by folding said gusset panels adjacent to each other and inward of said side and loading panels.
3. A lawn litter sled as described in claim 1 wherein each of said panels has at least two apertures defined by surfaces, said cord means being threaded through said apertures and frictionally engaging the surfaces defining said apertures to frictionally hold the panels in position to form said carrying body.
4. A lawn litter sled as described in claim 3 wherein said panels are formed from a single sheet of material, and the side and end panels are hinged to said bottom panel by fold lines in said sheet of material.
5. The lawn litter sled of claim 2 wherein each of said gusset panels has an aperture therethrough which aligns with the apertures of the other gusset panel in the set when the gusset panels are folded, said side panels and loading panel having apertures adjacent said sets of gusset panels to permit said cord means to be threaded through the apertures in the gusset panels and extend outwardly from the loading panel to form said tow rope, said apertures in said gusset panels having a frictional engagement with said cord means to be retained in desired positions along said cord means.
6. The lawn litter sled of claim 5 wherein the said cord means when pulled taut through said apertures will retain said loading panel in a substantially vertical position.
7. A lawn litter sled comprising:
   a carrying body including a bottom panel, substantially vertical panel means mounted to said bottom panel to form a perimetric wall defining an open top enclosure, said panel means including a loading panel movable between a substantially vertical and a substantially horizontal position, separate sets of foldable gusset panels at opposite ends of said loading panel between said loading panel and adjacent portions of said panel means, each set of gusset panels including at least two gusset panels which fold relative to each other whereby said loading panel can be moved from its substantially horizontal to its substantially vertical position by folding said gusset panels adjacent to each other and inward of said panel means, each of said gusset panels having an aperture which aligns with the aperture of the other gusset panel in the set when both gusset panels are folded adjacent to each other, said loading panel also having apertures adjacent to said gusset panel sets to permit a flexible cord means to be threaded through each gusset panel set and the openings in said loading panel and to extend outwardly from the loading panel to form a tow rope, said apertures in said gusset panels having a frictional engagement with said cord means, whereby said cord means when pulled taut through gusset panels will retain said loading panel in a vertical position.

* * * * *